United States Patent [19]
Garrett

[11] Patent Number: 5,644,785
[45] Date of Patent: Jul. 1, 1997

[54] GOLF STRAP RADIO CARRIER

[76] Inventor: Brent A. Garrett, 4141 W. Lake Cir., Littleton, Colo. 80123

[21] Appl. No.: 904,979

[22] Filed: Jun. 26, 1992

[51] Int. Cl.[6] .................................................. H04B 1/08
[52] U.S. Cl. ....................... 455/344; 455/348; 455/351; 150/109; 224/605; 224/930
[58] Field of Search ................................. 455/344, 347, 455/348, 351, 350, 343, 90, 100, 95; 224/202, 219, 229, 222, 267, 252, 901, 908, 205, 206; 340/588, 640, 571, 692, 525, 901; 150/109; 206/316.2; 381/24

[56] References Cited

U.S. PATENT DOCUMENTS

| | | | |
|---|---|---|---|
| 1,589,315 | 6/1926 | Johnston | 224/908 |
| 2,299,058 | 10/1942 | Mitchell | 250/14 |
| 2,533,440 | 12/1950 | Endee | 150/1.5 |
| 2,571,514 | 10/1951 | Andrews | 250/14 |
| 2,903,172 | 9/1959 | Carter | 224/219 |
| 3,114,105 | 12/1963 | Nuemiller | 455/351 |
| 3,370,236 | 2/1968 | Walker | 455/351 |
| 3,631,994 | 1/1972 | Mackzum, Jr. | 455/344 |
| 4,155,387 | 5/1979 | Costa | 150/1.5 R |
| 4,234,116 | 11/1980 | Myers | 224/267 |
| 4,434,509 | 2/1984 | Schrepel | 455/344 |
| 4,485,276 | 11/1984 | Sato | 179/157 |
| 4,500,019 | 2/1985 | Carley | 224/901 |
| 4,580,038 | 4/1986 | O'Loughlin | 340/588 |
| 4,702,342 | 10/1987 | Hale | 180/333 |
| 4,722,464 | 2/1988 | Wright | 224/224 |
| 4,726,070 | 2/1988 | Buzzi | 455/351 |
| 4,727,599 | 2/1988 | Rappaport | 455/347 |
| 4,745,260 | 5/1988 | Albinger | 340/640 |
| 4,764,962 | 8/1988 | Ekman et al. | 381/24 |
| 4,775,083 | 10/1988 | Burger et al. | 455/351 |
| 4,785,984 | 11/1988 | Seitz-Gangemi | 224/259 |
| 4,824,139 | 4/1989 | Robbins | 455/344 |
| 4,829,591 | 5/1989 | Hashimoto et al. | 455/89 |
| 4,834,274 | 5/1989 | Johnson | 224/240 |
| 4,855,736 | 8/1989 | Hsu | 340/901 |
| 4,864,646 | 9/1989 | Nesbit et al. | 455/344 |
| 4,870,702 | 9/1989 | Azzouni | 455/346 |
| 4,913,326 | 4/1990 | Echelson | 224/267 |
| 4,930,243 | 6/1990 | Lowe et al. | 43/17 |
| 4,942,995 | 7/1990 | Myers | 224/258 |
| 4,953,223 | 8/1990 | Householder | 381/24 |
| 5,175,576 | 12/1992 | Lancaster | 224/252 |
| 5,212,734 | 5/1993 | Tsao | 381/24 |

FOREIGN PATENT DOCUMENTS

| 2182552 | 5/1987 | United Kingdom | 206/316.2 |
|---|---|---|---|

*Primary Examiner*—Edward F. Urban
*Attorney, Agent, or Firm*—John E. Reilly

[57] ABSTRACT

A radio carrier facilitates mounting of a portable radio on a shoulder strap of a golf bag or to a motorized golf cart when desired and is made up of a sleeve-like strap member which can be adjustably secured in surrounding relation to the shoulder strap and a fastener for mounting the radio casing on the strap member so that the radio controls are readily accessible to the golfer when playing the game of golf. A motion detector circuit is provided as a part of the internal radio circuit to automatically control the on/off state of the radio.

9 Claims, 2 Drawing Sheets

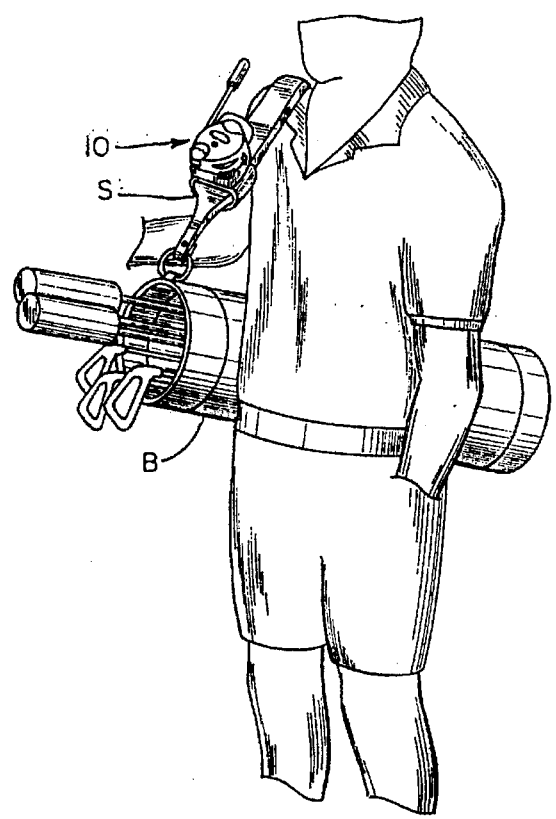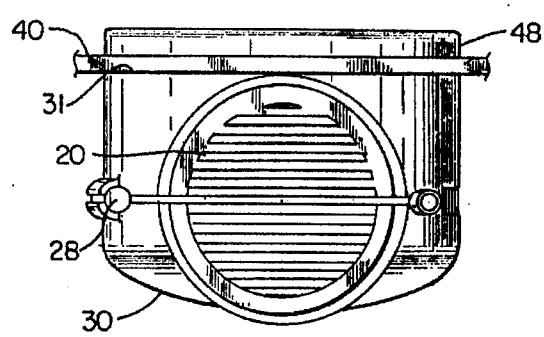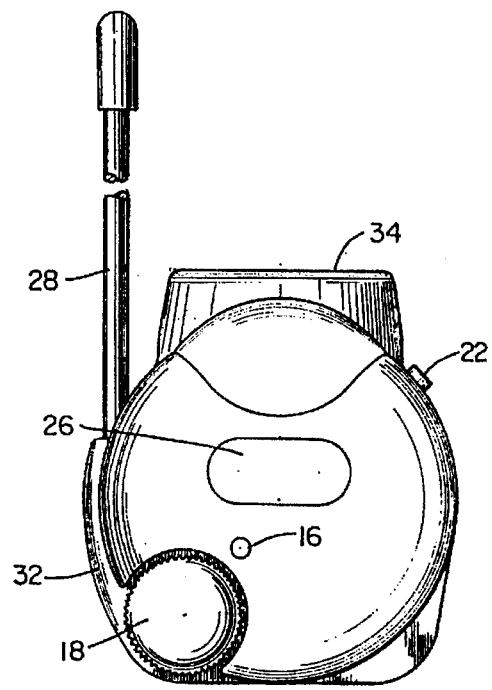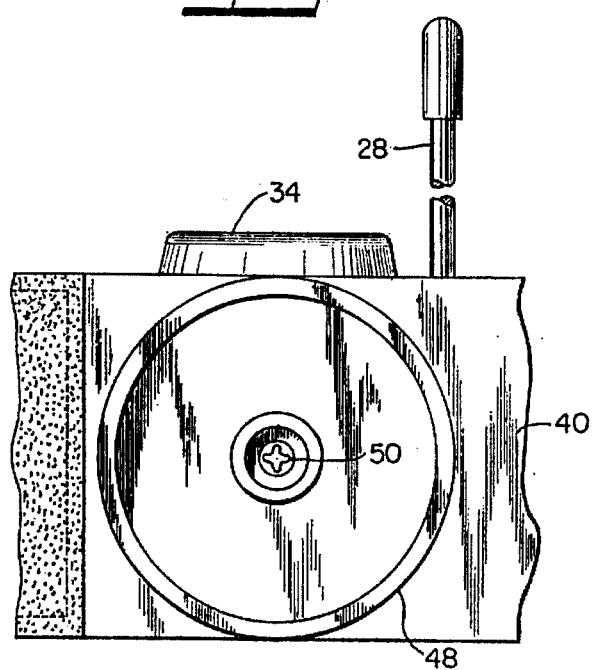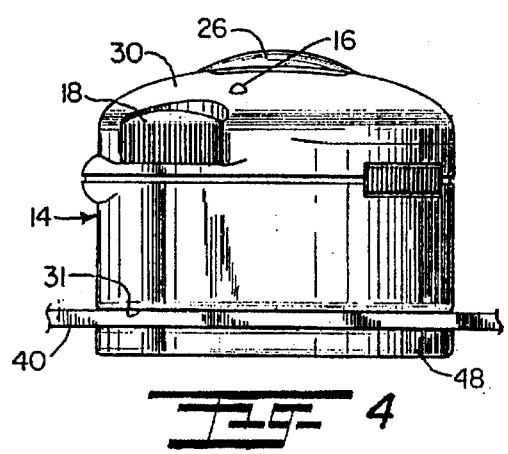

GOLF STRAP RADIO CARRIER

SPECIFICATION

This invention relates to radio holder devices; and more particularly relates to a novel and improved device for carrying a radio on a golf shoulder strap and in a convenient listening position while playing golf.

BACKGROUND AND FIELD OF THE INVENTION

Numerous systems have been devised for supporting or attaching a portable radio on a belt or article of clothing. However, to the best of my knowledge, no one has successfully devised a method or means by which a radio can be carried by a golfer in such a way that the radio may be conveniently controlled and listened to without interfering with the play of the game; and at the same time it is desirable that the radio be so carried and positioned as not to require the use of headphones.

Of the radio carriers that have been devised in the past, U.S. Pat. No. 4,864,646 to M. S. Nesbit et al discloses a neck strap having connectors at each end to attach to an article, such as, a camera or binoculars. However, the strap is designed to be used in place of a regular strap and not added to an existing strap, such as, a shoulder strap for a golf bag. In U.S. Pat. No. 4,764,962 to J. A. Ekman et al, a speaker system includes a radio or cassette player to be used in conjunction with a pair of suspenders with the speakers being releasably attached to shoulder portions of the suspenders. U.S. Pat. No. 4,722,464 to C. Wright discloses a belt type carrier having a plurality of pockets for retaining different components of an audio system. In U.S. Pat. No. 4,785,984 to K. Sietz-Gangemi, a harness-type carrier is employed for a radio and the radio is releasably attached by Velcro fasteners. Other representative patents are U.S. Pat. No. 2,299,058 to D. M. Mitchell, U.S. Pat. No. 2,571,514 to E. F. Andrews, U.S. Pat. No. 4,485,276 to M. Sato, U.S. Pat. No. 4,702,342 to J. Hale, U.S. Pat. No. 4,834,274 to B. E. Johnson and U.S. Pat. No. 4,942,995 to E. Myers.

Among other problems associated with the use of a portable radio in playing golf is to permit the radio to be releasably attached to some portion of the golf equipment so that it may easily be removed when not in use. However, it is important that the radio be so attached as to be fixed firmly in place but yet be adjustable in accordance with individual preference; also, that the controls be readily accessible for tuning or modulation as required or desired on the part of the user. Still further, it is desirable that the radio be automatically responsive to motion or pressure so that when the golfer is in motion, such as, in walking or riding, the radio will automatically play, but when the golfer stops to hit a shot or is waiting to hit, the radio will automatically turn off. The present invention is believed to overcome a number of the problems associated with radio holders or carriers which have been proposed in the past by providing for a convenient but secure means of attachment of the radio directly to the shoulder strap of the golf bag and which can be placed at the desired position along the strap so as to be accessible for control by either hand of the golfer and yet be placed close enough to one ear so as to be audible to the golfer without disturbing the other players.

SUMMARY OF THE INVENTION

It is therefore an object of the present invention to provide for a novel and improved radio holder device which is lightweight, compact and can be securely but releasably attached to an article, such as, a shoulder strap on a golf bag.

It is another object of the present invention to provide for a novel and improved radio carrier which is conformable for placement on different articles of golf equipment including but not limited to a steering column of a golf cart or shoulder strap and attached in such a way that the radio will be cushioned against jarring or sudden impacts while remaining well within the listening range of the user but not interfere in any way with the normal play of the game or be objectionable to other golfers.

It is a further object of the present invention to provide for a novel and improved radio holder device specifically adapted for mounting on a shoulder strap of a golf bag and which can be releasably secured to a selected or desired position on the shoulder strap to permit the golfer to listen to the radio without disturbing other golfers; and further wherein the on/off state of the radio may be controlled either by a manual switch or a motion detector circuit which will permit the radio to play only when the golfer is in motion.

In accordance with the present invention, a preferred form of radio holder device is adapted for insertion of the shoulder strap of a golf bag to be carried by a golfer wherein a portable radio has an outer casing and radio controls including volume and tuner control and at least one speaker in the casing of the radio, the holder comprising a sleeve-like member disposed in surrounding relation to the shoulder strap and means for mounting the radio casing on the sleeve-like member whereby the radio controls are accessible to the golfer when the golf bag is being carried by the golfer. Preferably, the sleeve-like member is in the form of an endless flexible loop when secured to the shoulder strap and has complementary connecting means at opposite ends of the strap for adjustably securing the sleeve-like member in closely surrounding relation to the shoulder strap; and the mounting means is defined by a flange and at least one fastener extending through the flange into the back surface of the radio casing with the sleeve-like member being interposed between the flange and casing.

Other objects, advantages and features of the present invention will become more readily appreciated and understood when taken together with the following detailed description of a preferred embodiment in conjunction with the accompanying drawings, in which:

BRIEF DESCRIPTION OF THE DRAWINGS

FIG. 1 is a perspective view of a preferred form of invention mounted on a golf shoulder strap;

FIG. 2 is a top plan view of the preferred form of radio holder device;

FIG. 3 is front view in elevation of the preferred form of radio;

FIG. 4 is a bottom plan view of the preferred form of radio holder device;

FIG. 5 is a rear view in elevation of the preferred form of radio holder device;

DETAILED DESCRIPTION OF PREFERRED EMBODIMENT

Figure 8:
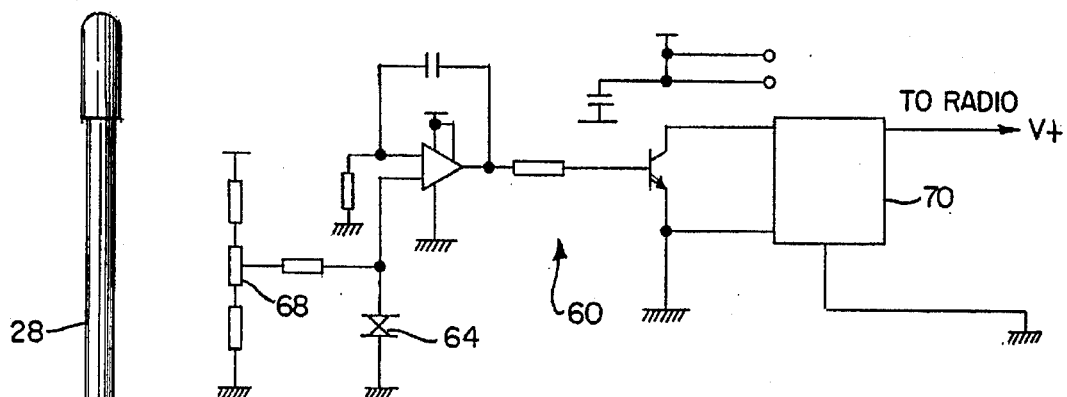
FIG. 8 is a somewhat schematic diagram of a motion detector circuit incorporated as a part of a standard radio control circuit in accordance with the present invention.
Figure 6:
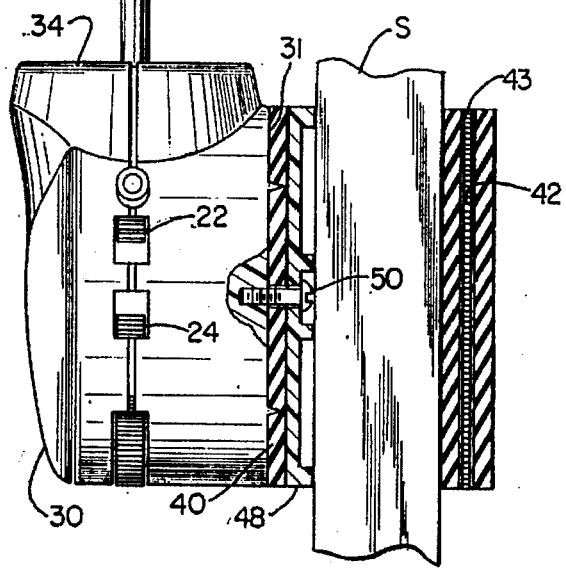
FIG. 6 is a side view partially in section of the preferred form of radio holder device in attached relation to a shoulder strap.
Figure 7:
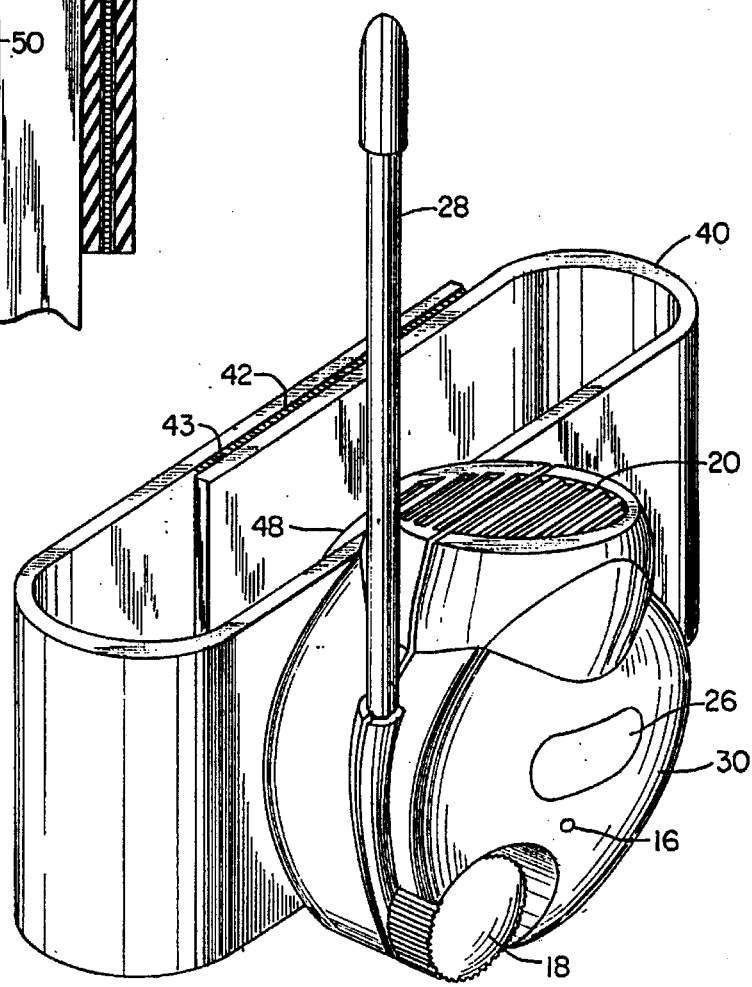
FIG. 7 is a perspective view of the preferred form of radio holder device.

Referring in more detail to the drawings, there is shown in FIGS. 1 to 7 a preferred form of radio holder device 10 which is designed for placement on a shoulder strap S of a golf bag B. As a setting for the present invention and by way of illustration in FIG. 1, the device 10 is so mounted on the shoulder strap as to be movable to a position on the strap relatively close to the golfer's ear so that the golfer can listen to the radio without disturbing other golfers. At the same time, the radio controls are readily accessible to the golfer.

A portable radio 12 is made up of an outer casing 14 with a tuner control 16, volume control 18 and weatherproof, directional speaker 20. An on/off switch 22 includes a motion mode control 23 to be hereinafter described, and an AM/FM selector switch 24 and a digital clock 26. A pliable antenna 28 extends upwardly along one side of the casing 14 and the casing has front and back surfaces 30, 31 and an outer circular sidewall 32 which terminates in an upper flat surface portion 34 in which the speaker 20 is disposed. (Doublecheck on location of volume control and other control at lower end of casing—not clear which is right side or left side.)

The shoulder strap mounting assembly for the radio comprises a flexible strap in the form of flexible webbing 40 having complementary connecting ends 42 and 43 and a center opening 44. Preferably, the connecting ends 42 and 43 are made up of Velcro or Velcro-like hook and pile fastening strips so that the webbing can be disposed in surrounding relation to the shoulder strap and adjusted by the connecting ends 42 and 43 to tightly surrounding the strap and prevent shifting of the strap 40 relative to the shoulder strap S. The back surface 31 of the casing is provided with a threaded bore 46 and a flange member in the form of a flat circular plate 48 having a central opening 49 which is aligned with a threaded bore 46 for insertion of a fastener screw 50 through the aligned openings 49, bore 46 and center opening 44 in the back surface so that the sleeve-like member 40 is sandwiched between the flange 48 and the back surface 31.

The radio circuit is of conventional construction except for a motion detector circuit 60 as illustrated in FIG. 8 and which may be electrically powered by a battery source, not shown, located within the radio casing. The motion detector circuit 60 is of a type which will complete the radio circuit upon being vibrated or moved with a predetermined force, such as, may occur through walking, bending, etc. When the motion detector circuit 60 is closed through the electrical leads 62 from the radio circuit, power is then applied to the radio circuit to turn it on and continue to remain on until the golfer should stop or should lay down the bag. One suitable form of motion detector circuit 60 includes a piezoelectric film 64 in the form of an extremely thin transducer strip and, for example, may be incorporated into an ELF Atochem sensor circuit manufactured and sold by Pennwalt Corporation of Belleville, N.J. The transducer can be secured in place to an inner wall surface of the casing 14 or directly to a part of the radio circuit. The electrical output current from the film 64 is connected to the base of a transistor $Q_1$ as well as to a potentiometer 68, the latter being adjustable to allow for variations in sensitivity of the crystal and establish the amount of motion required to trigger the crystal. The collector of the transistor $Q_1$ triggers a timer circuit 70 which operates as a delay so that the radio will not turn off until a selected time period after motion stops and which, for example, may be on the order of 10–15 seconds. In this way, the radio will continue to play for the selected time interval if the golfer should momentarily stop or lay down the golf bag. Thus, the radio will continue to play unless the golfer and/or the bag remain motionless for a time interval beyond that set in the timer circuit.

The flexible, generally sleeve-like strap member 40 enables positioning of the radio at any desired location along the length of the shoulder strap to be in relatively close proximity to the golfer's ear so as not to disturb other golfers in the group. Most desirably, the webbing of the strap is coated with a neoprene or other high friction material so that when wrapped around the shoulder strap will snugly engage the shoulder strap and prevent accidental slipping or movement when the golfer is walking or should place the bag on the ground. Moreover, the strap 40 is so constructed as to be easily releasable from the shoulder strap at any time during the round of golf or when the round is completed and is sufficiently compact that the entire holder device including the radio can be stored in the pocket of the golf bag or separately stored. In the event that the golfer is riding in a cart, the holder device 10 may be releasably secured on the steering wheel or some other stationary part of the golf cart rather than being placed on the shoulder strap S.

It will be evident that in the event that an individual golfer should desire to secure the radio directly to the shoulder strap as a more permanent mounting, the flexible strap 40 may be removed and the screw 50 inserted directly through the flange 48, through the thickness of the shoulder strap S and into the threaded bore 46 so that the back surface of the casing 14 is flush with the front surface of the shoulder strap S.

It is therefore to be understood that while a preferred form of invention has been herein set forth and described, various modifications and changes may be made in the construction and arrangement of parts without departing from the spirit and scope of the invention as defined by the appended claims.

I claim:

1. In a radio holder device for releasable securing a portable radio to a shoulder strap to be placed over a shoulder of a person wherein said radio has an outer casing and radio controls including volume and tuner controls in said casing, the improvement comprising:

a flexible strap member having means for adjustably securing said device to a front portion of said shoulder strap whereby to permit adjustable positioning of said device in a direction lengthwise of said shoulder strap;

mounting means on a back surface of said outer casing for mounting said back surface directly to said strap member whereby said radio controls are exposed and accessible to the person when said shoulder strap is placed over the shoulder, said mounting means defined by a flange member and at least one fastener member extending through said flange member into a back surface of said outer casing with said strap member interposed between said flange member and said outer casing; and motion detector means in said radio for automatically turning off said radio when said radio is not in motion.

2. In a radio holder device according to claim 1, wherein said flange member is in the form of a generally flat plate of a size no greater than the back surface of said outer casing to which said plate is attached.

3. In a radio holder device for adjustably positioning a portable radio on a front portion of a shoulder strap of a golf bag to be carried by a golfer wherein said radio has an outer casing including volume and tuner controls therein, the improvement comprising:

a flexible strap member;

mounting means for attaching said flexible strap member directly to a back surface of said outer casing;

securing means for adjustably securing said radio to a front portion of said shoulder strap whereby to permit adjustable positioning of said radio in a direction lengthwise of said shoulder straps; and motion detector means associated with said radio and responsive to motion of said radio for automatically turning on said radio, said motion detector means including a timer circuit to automatically turn off said radio a predetermined time interval after said radio is not in motion.

4. In a radio holder device according to claim 3, said securing means being in the form of a flexible strap having complementary connecting ends at opposite ends of said strap for adjustably securing said radio in closely surrounding relation to said shoulder strap.

5. In a radio holder device according to claim 3, said mounting means including a rigid backing member and at least one fastener member extending through said backing member into the back surface of said outer casing.

6. A radio holder device for releasably securing a portable radio to a shoulder strap placed over a shoulder of a person wherein said radio has an outer casing and a radio circuit including volume and tuner controls on a front portion of said casing, the combination therewith comprising:

a generally sleeve-like, flexible strap member having complementary connecting means at opposite ends of said strap member for adjustably securing said strap member in closely surrounding relation to said shoulder strap;

a flange and at least one fastener extending through said flange into a back portion of said casing, an intermediate portion of said flexible strap member being interposed between said flange and said casing; and a motion detector circuit in said casing including a transducer strip responsive to movement of said radio to turn on said radio circuit as long as said radio is in motion, said motion detector circuit means further including a timer circuit to automatically turn off said radio a predetermined time interval after said radio is not in motion.

7. A device according to claim 6, said complementary connecting means consisting of Velcro-like hook and pile fastening strips releasably securing said strap member in closely surrounding relation to said shoulder strap.

8. A device according to claim 6, said strap member having a frictional surface engageable with said shoulder strap when said complementary connecting means are interconnected to one another in closely surrounding relation to said strap.

9. In a radio holder device for releasable securing a portable radio to a shoulder strap to be placed over a shoulder of a person wherein said radio has an outer casing and radio controls including volume and tuner controls in said casing, the improvement comprising:

a flexible strap member having means for adjustably securing said device to a front portion of said shoulder strap whereby to permit adjustable positioning of said device in a direction lengthwise of said shoulder strap;

mounting means on a back surface of said outer casing for mounting said back surface directly to said strap member whereby said radio controls are exposed and accessible to the person when said shoulder strap is placed over the shoulder; and motion detector means including timer means in said radio for automatically turning off said radio a predetermined time interval after said radio is not in motion.

* * * * *